Patented Feb. 5, 1946

2,394,307

UNITED STATES PATENT OFFICE 2,394,307

CAPILLARY ACTIVE AGENTS

Winfrid Hentrich, Rodleben, near Dessau-Rosslau, and Heinz-Joachim Engelbrecht and Erik Schirm, Dessau, Germany; vested in the Alien Property Custodian No Drawing. Application June 6, 1941, Serial No. 396,964. In Germany June 7, 1940

3 Claims. (Cl. 260—401)

This invention relates to capillary active agents and the process of making the same.

It has been found that valuable capillary active agents can be produced by treating compounds having the general formula NH₂.Ar.X.NH.Y.R with acylating or alkylating agents containing at least three carbon atoms in the molecule. In this general formula Ar denotes an aromatic hydrocarbon residue which may also comprise core substituents such as for instance halogen-, hydroxyl-, alkyl-, alkoxy-residues or the like or a second amino-residue; preferably Ar denotes a substituted benzol-residue.

The residues X and Y denote either both the radical SO₂ or one of them the radical SO₂ and the other the radical CO.

R denotes an aliphatic or an aromatic hydrocarbon residue which may be substituted.

For the production of the capillary active agents there are preferably used aminoaryl compounds following the general formula NH₂.Ar.CO.NH.SO₂.R or NH₂.Ar.SO₂.NH.CO.R The following are examples of amino-aryl compounds of the general formula referred to: N-(3-amino - benzol - sulphonyl) - acetamide, N - (3-amino-4-chlor- or 4-alkoxy-benzol-sulphonyl) - acetamide, N-(3-amino-4 - methyl - benzol - sulphonyl)-propionamide, N-(4-amino-benzol - sulphonyl)-butyryl-amide, N-(3-amino-benzol-sulphonyl)-lauramide, N-(3-amino-benzol-sulphonyl)-benzamide, N-(3- or 4-amino-benzoyl) methane-sulphamide, N-(3-amino-4-methyl-benzoyl)-benzol-sulphamide, N - (3' - amino - benzoyl) - 3-amino-benzol-sulphamide, N-(3'-amino-4-methoxy-benzoyl)-4-amino - benzol - sulphamide, and the like.

The amino compounds mentioned are produced in the usual way, for example by acting with aryl-sulphonamides, or salts thereof, the aryl residue of which contains a group capable of conversion into an amino group, on aliphatic or aromatic carboxylic acid chlorides. Upon completion of the reaction, the amino groups are formed from the groups that permit of conversion into an amino group, for which latter the acylamino groups and nitro groups chiefly come into consideration. The aromatic amino compounds mentioned can further be produced by the action of aromatic carboxylic acid chlorides, the aromatic residue of which contains groups capable of conversion into amino groups, on aliphatic or aromatic sulphonic acid amides, whereby the amino groups are thereafter similarly formed in the condensation product.

For the production of the capillary active agents there may further be used aromatic amino compounds following the general formulae NH₂.Ar.SO₂.NH.SO₂.R and NH₂Ar.SO₂.NH.SO₂.Ar—NH₂

Such aromatic amino compounds are for instance 3 - amino - benzol - benzolsulphimide, 3-amino-benzol-4'-methyl-benzol - sulphimide, 3-amino-benzol-methane-sulphimide or another 3-amino-benzol-alkan-sulphimide, 3-amino-benzol-benzol-sulphimide-3'-carbonic acid, 3.3'-diamino-dibenzol-sulphimide or its core substitution products, such as for instance halogen-, hydroxyl-, methyl-, ethyl-, methoxy-, ethoxy-, phenoxy-, amino-substituted products and the like. These amino-diaryl-sulphimides, for instance, can be obtained by the conversion of aryl-sulphochlorides, which contain in the aryl residue a group which is convertible into an amino group, with alkyl- or aryl-sulphamides, and by subsequent conversion of the group which is convertible into an amino group, that is, for instance, of a nitro- or acyl-amino group into the amino group. Also the opposite way may be followed by converting aryl-sulphamides which comprise in the aryl residue a group convertible into an amino group with alkyl- or aryl-sulpho-chlorides and by subsequently forming the amino group. In either case known processes are used.

According to this invention these aromatic amino compounds are acted upon by acylating or alkylating agents which comprise at least 3 C-atoms and about up to 18 C-atoms in the molecule. The action of the acylating or alkylating agents on the aromatic amino compounds takes place according to methods which are known.

The acylating agents that chiefly come into consideration are the fatty acids and their functional derivatives, such as for example, fatty acid anhydrides, fatty acid esters, fatty acid halides, and the like, and further organic sulphonic acid halides. Esters of chlorated carboxylic acid, isocyanates, isothiocyanates, and chlorides of urea further come into consideration. The following alkylating agents may be mentioned: halogen alkyls, halogen alkylating products of alcohols, carboxylic acid and sulphonic acid amides, sulphuric acid or aryl-sulphonic acid esters of compounds with aliphatically combined hydroxyl groups, and the like. The foregoing alkylating and acylating agents may also contain lipophile residues of higher molecular weight, i. e., aliphatic hydrocarbon residues with at least six carbon atoms, or cyclo-aliphatic or aromatic hydrocarbon residues which possess a side chain of at least three hydrocarbon atoms.

As examples of these acylating and alkylating agents we mention the following: propionic acid, butyric acid, capric acid, a mixture of coconut oil fatty acids, oleic acid, palmitic acid, mixtures of any fatty acids, naphthenic acid, resin acids, acetyl chloride, acetic acid anhydride, stearic acid chloride, montanic acid chloride, cetyl-sulphonic acid chloride, stearyl-sulphonic acid chloride, chlorated carboxylic acid dodecyl ester, chlorated carboxylic acid hexadecyl ester, octylisocyanate, dodecyl-isothiocyanate, N-carbonyl-palmitic acid amide, N-carbonyl stearic acid amide, N-carbonyl-cetylsulphonic-acid amide, N-carbonyl-stearyl-sulphonic acid amide, dodecyl-urea chloride, and the like. The following may be mentioned as examples of alkylating agents: propyl chloride, octylchloride, dodecyl chloride, octyl-chloride, dodecyl chloride, dodecyl-chlor-methyl-ether, hexadecyl-chlor-methyl-ether, and the like. The hydrocarbon residues of these agents belonging to the aliphatic or cyclo-aliphatic series or mixtures of these two series, or to the fatty aromatic series, may also contain familiar heteroatoms or heteroatomic groups, or substitutes thereof, such, for example, as halogen, hydroxyl groups, and so on, as is the case, for example, with octyl-hydroxy-acetyl chloride, or iso-octyl-phenoxy-acetyl chloride.

The agents referred to may act on the aromatic amino compounds according to usual methods in an aqueous medium or in the presence of organic solvents, according to the initial products used. If necessary, an elevated temperature may be applied for the reaction, and further, as far as necessary, agents that bind water or acid. For example, acylation by means of carboxylic acids may also be carried out in toluol solution in the presence of phosphorus trichloride or thionyl chloride. In order to facilitate the reaction, these amino groups may previously be converted into an isocyanate group upon which these fatty acids are allowed to act, whereby reaction takes place while carboxylic acid is split off.

For the production of the capillary active agents from aromatic amino compounds of the general formula NH$_2$.Ar.SO$_2$.NH.SO$_2$.R mainly acylating agents come into question, which may also contain higher molecular lipophile residues, that is aliphatic or cyclo-aliphatic hydrocarbon residues of at least six hydrocarbon atoms in the molecule or aromatic hydrocarbon residues having side chains of at least three carbon atoms.

The compounds obtained by the process forming part of the present invention are of the general formula R'.NH.Ar.X.NH.Y.R. In this formula Ar, X, Y, R denote the above mentioned substances. Accordingly, R is an aliphatic or an aromatic residue. In the latter case the residue may also comprise an amino substitute which has been alkylated or acylated. R' denotes an alkyl residue or an acyl residue.

By acyl residue there is understood the residue R.CO as well as the residue R.O.CO (from chlor carboxylic acid esters) and R.NH.CO (from chlorides of urea or isocyanates).

Thus, the capillary active agents produced according to this invention may have the general formula R'.NH.Ar.CO.NH.SO$_2$.R or
R'.NH.Ar.SO$_2$.NH.CO.R Such compounds are, for instance, N-(3-lauroyl-amino-benzol-sulphonyl)-benzamide, N-(3-palmitoyl-amino-benzoyl)-methane-sulphamide, N-(3'-capronoyl-amino-benzoyl)-3-capronoyl-amino-benzol-sulphamide, N-(3-propionyl-amino-benzol-sulphonyl)-benzamide, N-(3-butyryl-amino-benzol-suphonyl)-benzamide, N-(3-capronoyl-amino-benzol-sulphonyl)-benzamide, N-(3-capryloyl-amino-benzol-sulphonyl)-propane-sulphamide, N-(3-caprinoyl-amino-benzol-sulphonyl)-octane-sulphamide, N-(3'-capryloyl-amino-benzoyl)-3-capryloyl-amino-benzol-sulphamide, N-(3'-caprinoyl-amino-benzoyl)-3-caprinoyl-amino-benzol-sulphamide, N-(3-capronyl-amino-benzol-sulphonyl)-benzamide, N-(3-caprylyl-amino-benzol-sulphonyl)-propane-sulphamide, and N-(3-caprinyl-amino-benzol-sulphonyl)-octane-sulphamide.

Furthermore, the capillary active substances produced according to this invention may be of the general formula R'.NH.Ar.SO$_2$.NH.SO$_2$.R, especially R'.NH.Ar-SO$_2$.NH.SO$_2$.Ar.NH.R'. Such compounds are for instance 3-lauroyl-amino-benzol-benzol-sulphimide, 3-lauroyl-amino-benzoyl-methane-sulphimide, 3.3'-dicapryloyl-amino-dibenzol-sulphimide, 3-capronoyl-amino-benzol-benzol-sulphimide, 3-capryloyl-amino-benzol-methane-sulphimide, 3-caprinoyl-amino-benzol-methane-sulphimide, 3-palmitoyl-amino-benzol-methane-sulphimide, 3.3'-dicapronoyl-amino-dibenzol-sulphimide, 3.3'-dicaprinoyl-amino-dibenzol-sulphimide.

The compounds obtained by the process forming part of this invention are amorphous bodies and possess surface-active properties. They also are possessed of a considerable detergent and frothing property, even if the residues that have been introduced by acylation or alkylation are of a relatively low molecular character. The optimum of detergent property is present in such compounds in which the hydrocarbon residue R' comprises about from 6 to 10 carbon atoms. The compounds, therefore, may advantageously be employed in connection with washing, cleaning, wetting, dispersing and emulsifying processes, such as are customary in the textile and laundry-industry, fur-industry, leather-industry and other industries. The products may be used as such or also in combination with known washing and cleaning agents or as an addition to such agents.

*Example 1*

276 parts by weight of N-(3-amino-benzol-sulphonyl)-benzamide are dissolved in 1500 parts by weight of water with the addition of 40 parts by weight of sodium hydroxide. After adding 200 parts by weight of crystallized sodium acetate, the solution is cooled to 2 degr. C. and a mixture of 300 parts by weight of oleic acid chloride and 300 parts by volume of acetone are stirred in at a temperature of 2 to 5 degr. C. Stirring is kept up for half an hour at 2 degr. C., 500 parts by weight of water are added, and the whole is treated with 20 percent soda solution until litmus paper shows a neutral reaction. Condensation is completed by heating the reaction mixture for one hour at 50 degr. C. The clear, thickish solution is then diluted with 3000 parts of water and 1250 parts by weight of common salt are added; as soon as the salt has dissolved, the mixture is cooled to about 5 degr. C. The precipitate is removed by pressure or centrifuging and dried at 100 degr. C. It represents an amorphous mass that dissolves in water, producing a heavy froth. The yield of the condensation product is between 85 and 90 percent of the theoretical. Its formula is

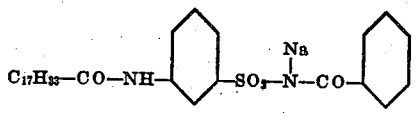

Example 2

276 parts by weight of N-(3'-amino-benzoyl-) benzol-sulphamide are dissolved in 1500 parts by weight of pyridine and the solution is cooled to 2 degr. C. Then 240 parts by weight of lauric acid chloride diluted with an equal volume of acetone are stirred in at 2 to 5 degr. C.; stirring is kept up for one hour at ordinary temperature, which is then raised to 50 degr. C. and 10 percent soda solution is cautiously added until litmus paper shows a permanently alkaline reaction. The reaction mixture is then distilled under considerably reduced pressure, the dry residue is dissolved in the requisite quantity of hot water, and the condensation product is isolated by salting out, filtering when cold, and drying. The mass can be pulverized and dissolves in water giving rise to froth. The yield is similar to that of Example 1.

Example 3

An aqueous solution of the sodium salt of 291 parts by weight of N-(3'-amino-benzoyl)-3-amino-benzene-sulphamide of the formula

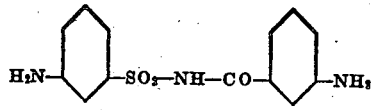

is prepared as described in Example 1. After having added 300 parts by weight of crystalline sodium acetate, 350 parts by weight of caprylic acid chloride are gradually added at 0 to 5 degr. C. After neutralization with soda, the reaction is completed by heating to 50 degr. C., as described in the foregoing Example 1, and the condensation product is recovered in excellent yield, as there described, by salting out, filtering and drying. In spite of the fact that the alkyl residues are of comparatively low molecular weight, the product possesses remarkably good detergent properties.

Example 4

236 parts by weight of the sodium salt of N-(3-amino-benzene-sulphonyl)-acetamide, 250 parts by weight of n-dodecyl bromide, 30 parts by weight of magnesium oxide, 1200 parts by weight of alcohol, and 1200 parts by weight of water are heated for six hours at 150 degr. C. in an autoclave fitted with a stirrer. The reaction liquid is filtered, while still hot, to the filtrate is added hydrochloric acid, and the bright amorphous precipitate after cooling is removed by suction, filtered and dried. The product is of a waxy nature and dissolves easily in hot dilute soda solution while frothing.

Example 5

155 parts by weight of thionyl chloride are caused to trickle under stirring at a temperature of about 30° C. into a mixture consisting of 164 parts by weight of 3.3'-diamino-dibenzol-sulphimide, 150 parts by weight of caprylic acid and 900 parts by weight of toluol; the mixture is thereupon heated for some hours at the reflux cooler to boiling condition. On ceasing development of gas the non-dissolved reaction product is separated by suction and washed with toluol. The residue is dissolved in soda solution, precipitated by means of diluted hydrochloric acid and recrystallized from alcohol (melting point at 173° C.). By treatment with soda lye the formed 3.3'-dicaryloyl-amino-dibenzol-sulphimide is converted into the sodium salt which is soluble in water yielding vigorously frothing solutions.

By replacing the caprylic acid by a mixture of fatty acids ($C_7$–$C_9$) having an acid number 390, which mixture is obtained by oxidation of paraffine, there will result a product having similar properties.

Example 6

215 parts by weight of dodecyl-isocyanate are caused to trickle well cooling into a solution consisting of 326 parts by weight of 4-methyl-3-aminobenzol-benzol-sulphimide and 900 parts by weight of pyridine; the mass is subsequently stirred for some time at 50° C. On removing the pyridine by distillation the residue is worked in the manner stated in Example 1 and converted into the corresponding sodium salt. There will be obtained a good yield of a condensation product having the formula:

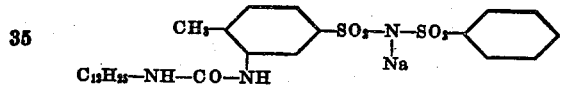

which in an aqueous solution is of a pronounced soaplike character.

By using as original material the N-carbonyl-hexadecyl-sulphoacid-amide instead of the dodecylisocyanate there is likewise obtained a product having capillary active properties.

We claim:

1. A process for producing a capillary active agent which consists in adding an alkaline salt of an aliphatic carboxylic acid to an alkaline aqueous solution of N-(3 aminobenzol-sulphonyl) benzamide, cooling, adding a mixture of oleic acid chloride and acetone with agitation and cooling, diluting with water, neutralizing with an alkaline solution, heating to condensation and precipitating with sodium chloride.

2. A process for producing a capillary active agent which consists in adding an alkaline salt of an aliphatic carboxylic acid to an alkaline aqueous solution of N-(3 aminobenzol-sulphonyl) benzamide, cooling, adding a mixture of a fatty acid chloride and acetone with agitation and cooling, diluting with water, neutralizing with an alkaline solution, heating to condensation and precipitating with sodium chloride.

3. A compound of the formula

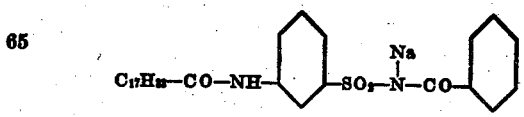

WINFRED HENTRICH.
HEINZ-JOACHIM ENGELBRECHT.
ERIK SCHIRM.